(12) United States Patent
Park et al.

(10) Patent No.: US 12,105,027 B2
(45) Date of Patent: Oct. 1, 2024

(54) APPARATUS FOR INSPECTING SUBSTRATE AND METHOD FOR FABRICATING SEMICONDUCTOR DEVICE USING THE SAME

(71) Applicant: SAMSUNG ELECTRONICS CO., LTD., Suwon-si (KR)

(72) Inventors: Jang Ryul Park, Hwaseong-si (KR); Soon Yang Kwon, Seoul (KR); Kwang Rak Kim, Gunpo-si (KR); Myung Jun Lee, Seongnam-si (KR); Sung Ho Jang, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 282 days.

(21) Appl. No.: 17/684,052

(22) Filed: Mar. 1, 2022

(65) Prior Publication Data
US 2023/0028347 A1    Jan. 26, 2023

(30) Foreign Application Priority Data
Jul. 22, 2021 (KR) .......................... 10-2021-0096179

(51) Int. Cl.
| | | |
|---|---|---|
| G01N 21/95 | (2006.01) | |
| G02B 7/00 | (2021.01) | |
| G01N 21/88 | (2006.01) | |
| G02B 3/00 | (2006.01) | |

(52) U.S. Cl.
CPC ......... *G01N 21/9501* (2013.01); *G02B 7/005* (2013.01); *G01N 2021/8845* (2013.01); *G02B 2003/0093* (2013.01)

(58) Field of Classification Search
CPC ....... G01N 2021/8845; G01N 21/9501; G01N 21/8806; G01N 21/95684; G02B 7/005; G02B 13/0045; G02B 13/18; G02B 2003/0093; G02B 9/62; B31B 50/104;
(Continued)

(56) References Cited

U.S. PATENT DOCUMENTS

| | | |
|---|---|---|
| 8,445,188 B2 | 5/2013 | Mohseni |
| 9,291,915 B2 | 3/2016 | Csete et al. |
| 9,310,290 B2 | 4/2016 | Wang et al. |

(Continued)

FOREIGN PATENT DOCUMENTS

| | | | |
|---|---|---|---|
| CN | 204142632 U | * | 2/2015 |
| CN | 108445261 A | | 8/2018 |

*Primary Examiner* — Tri T Ton
(74) *Attorney, Agent, or Firm* — Sughrue Mion, PLLC

(57) ABSTRACT

A method for fabricating a semiconductor device is provided. The method includes: loading a substrate on a stage of an apparatus for inspecting the substrate; extracting a first light having a first wavelength from a light by using a light source; acquiring first position information on at least one focal point, formed on the substrate, based on the first wavelength by using a controller, the at least one focal point being a pre-calculated at least one focal point; adjusting a position of at least one from among an objective lens and at least one microsphere in a vertical direction by using the first position information in the controller; condensing the first light, which has passed through the at least one microsphere, on the at least one focal point formed on the substrate; and inspecting the substrate by using the first light condensed on the at least one focal point.

18 Claims, 15 Drawing Sheets

(58) Field of Classification Search
CPC ....... B31B 50/26; B31B 50/811; G03B 17/12; H04N 23/55
USPC ...................... 356/237.1–237.6, 239.1–239.8
See application file for complete search history.

(56) References Cited

U.S. PATENT DOCUMENTS

| | | |
|---|---|---|
| 9,726,874 B2 | 8/2017 | Astratov et al. |
| 10,254,164 B2 | 4/2019 | Zollars et al. |
| 10,345,093 B2 | 7/2019 | Kassamakov et al. |

* cited by examiner

APPARATUS FOR INSPECTING SUBSTRATE AND METHOD FOR FABRICATING SEMICONDUCTOR DEVICE USING THE SAME

CROSS-REFERENCE TO THE RELATED APPLICATION

This application claims priority from Korean Patent Application No. 10-2021-0096179, filed on Jul. 22, 2021 in the Korean Intellectual Property Office, and all the benefits accruing therefrom under 35 U.S.C. 119, the entire contents of which are herein incorporated by reference.

BACKGROUND

Technical Field

Embodiments of the present disclosure relate to an apparatus for inspecting a substrate and a method for fabricating a semiconductor device using the same.

Description of the Related Art

With a highly advanced semiconductor process and importance of yield, non-destructive three-dimensional spectral measurement for process management is important. Also, as a size of a semiconductor product becomes ultra-fine, a size of a spot size required for inspection and measurement becomes smaller.

The spot size is determined by performance of a light source, a condensing lens, a camera, etc. during spectral measurement. Performance of components for non-destructive inspection has been highly advanced, and has already reached physical and Rayleigh limits. For this reason, studies for remarkably reducing a spot size during spectral measurement is ongoing.

SUMMARY

An aspect of the present disclosure is to provide an apparatus for inspecting a substrate and a method for fabricating a semiconductor device using the same, in which light passing through an objective lens is additionally condensed on a substrate using a microsphere disposed between a stage and the objective lens at a diameter of about 1/500 or less than a diameter of the objective lens to improve reliability in inspection of the substrate.

According to one or more embodiments, a method for fabricating a semiconductor device is provided. The method includes: loading a substrate on a stage of an apparatus for inspecting the substrate; extracting a first light having a first wavelength from a light having a plurality of wavelengths by using a light source; acquiring first position information on at least one focal point, formed on the substrate, based on the first wavelength by using a controller, the at least one focal point being a pre-calculated at least one focal point; adjusting a position of at least one from among an objective lens and at least one microsphere in a vertical direction by using the first position information in the controller; condensing the first light, which has passed through the at least one microsphere, on the at least one focal point formed on the substrate; inspecting the substrate by using the first light condensed on the at least one focal point; and unloading the substrate, for which inspection has been completed, from the apparatus for inspecting the substrate, wherein the at least one microsphere is disposed between an upper surface of the stage and the objective lens.

According to one or more embodiments, an apparatus for inspecting a substrate is provided. The apparatus includes: a stage on which the substrate is configured to be loaded; a light source configured to extract a first light having a first wavelength from a light having a plurality of wavelengths, and provide the first light to the substrate; an objective lens disposed on an upper surface of the stage and configured to allow the first light to pass therethrough; at least one microsphere disposed between the upper surface of the stage and the objective lens, the at least one microsphere configured to allow the first light provided from the objective lens to pass therethrough, and to condense the first light on the substrate; a detector configured to detect a reflected light formed by the first light reflected from the substrate to inspect the substrate; and a controller configured to control a position of at least one from among the objective lens and the at least one microsphere in a vertical direction such that the first light is condensed on at least one focal point formed on the substrate.

According to one or more embodiments, an apparatus for inspecting a substrate is provided. The apparatus includes: a stage on which the substrate is configured to be loaded; a light source configured to extract a first light having a first wavelength from a light having a plurality of wavelengths, and provide the first light to the substrate; an objective lens disposed on an upper surface of the stage and configured to allow the first light to pass therethrough; an objective lens driving unit that comprises an actuator and is configured to move the objective lens in a vertical direction; a microsphere, that has a spherical shape, disposed between the upper surface of the stage and the objective lens, the microsphere configured to allow the first light provided from the objective lens to pass therethrough, and to condense the first light on the substrate; a microsphere driving unit that comprises an actuator and is configured to move the microsphere in the vertical direction; a detector configured to detect a reflected light formed by the first light reflected from the substrate to inspect the substrate; and a controller configured to control a position of each of the objective lens and the microsphere in the vertical direction by controlling the objective lens driving unit and the microsphere driving unit such that the first light is condensed on a focal point formed on the substrate. The controller is further configured to: acquire information on the first wavelength of the first light extracted by the light source, acquire first position information on the focal point, which is pre-calculated, based on the first wavelength, and control the position of at least one from among the objective lens and the microsphere in the vertical direction by using the first position information.

According to one or more embodiments, an apparatus for inspecting a substrate is provided. The apparatus includes: a stage on which the substrate is configured to be loaded; a light source configured to extract a first light having a first wavelength from a light having a plurality of wavelengths, and provide the first light to the substrate; an objective lens disposed on an upper surface of the stage and configured to allow the first light to pass therethrough; at least one microsphere disposed between the upper surface of the stage and the objective lens, the at least one microsphere configured to allow the first light provided from the objective lens to pass therethrough, and to condense the first light on the substrate, the at least one microsphere is spaced apart from each of the objective lens and the substrate; a microsphere driving unit that includes an actuator and is configured to move the microsphere in a vertical direction; and a controller configured to control a position of the at least one microsphere in the vertical direction such that the first light is condensed on at least one focal point formed on the substrate.

The aspects of the present disclosure are not limited to those mentioned above and additional aspects of the present disclosure, which are not mentioned herein, will be clearly understood by those skilled in the art from the following description of the present disclosure.

BRIEF DESCRIPTION OF THE DRAWINGS

The above and other aspects and features of the present disclosure will become more apparent by describing in detail non-limiting example embodiments thereof with reference to the attached drawings, in which.

DETAILED DESCRIPTION OF THE EMBODIMENTS

Hereinafter, an apparatus for inspecting a substrate according to some embodiments of the present disclosure will be described with reference to FIGS. 1 to 3.

Figure 1:
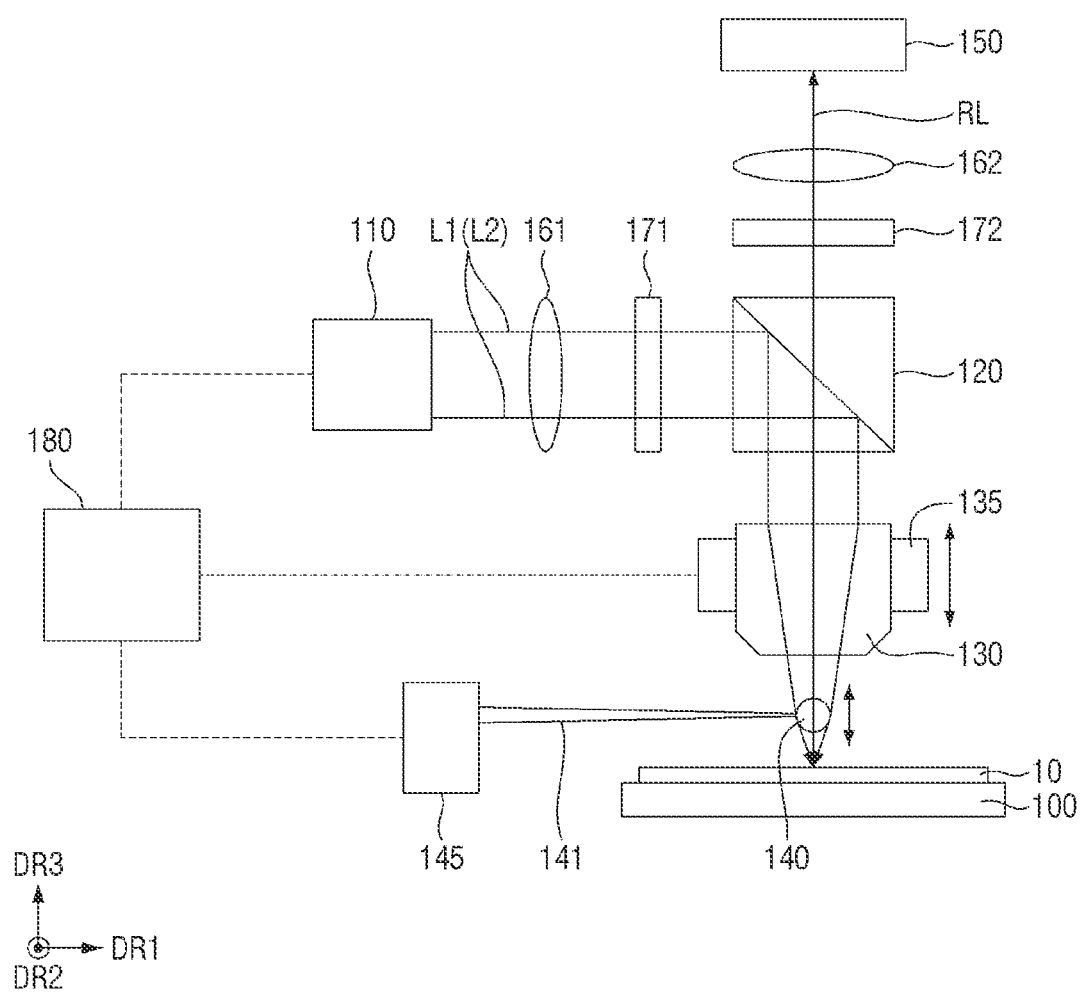
FIG. 1 is a view illustrating an apparatus for inspecting a substrate according to some embodiments of the present disclosure.

FIG. 1 is a view illustrating an apparatus for inspecting a substrate according to some embodiments of the present disclosure. FIG. 2 is a view illustrating a microsphere included in an apparatus for inspecting a substrate according to some embodiments of the present disclosure. FIG. 3 is a view illustrating that light is condensed using a microsphere included in an apparatus for inspecting a substrate according to some embodiments of the present disclosure.

Figure 2:
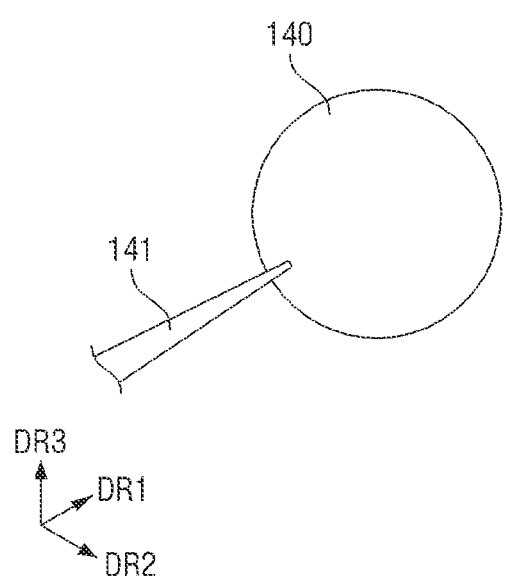
FIG. 2 is a view illustrating a microsphere included in an apparatus for inspecting a substrate according to some embodiments of the present disclosure.
Figure 3:
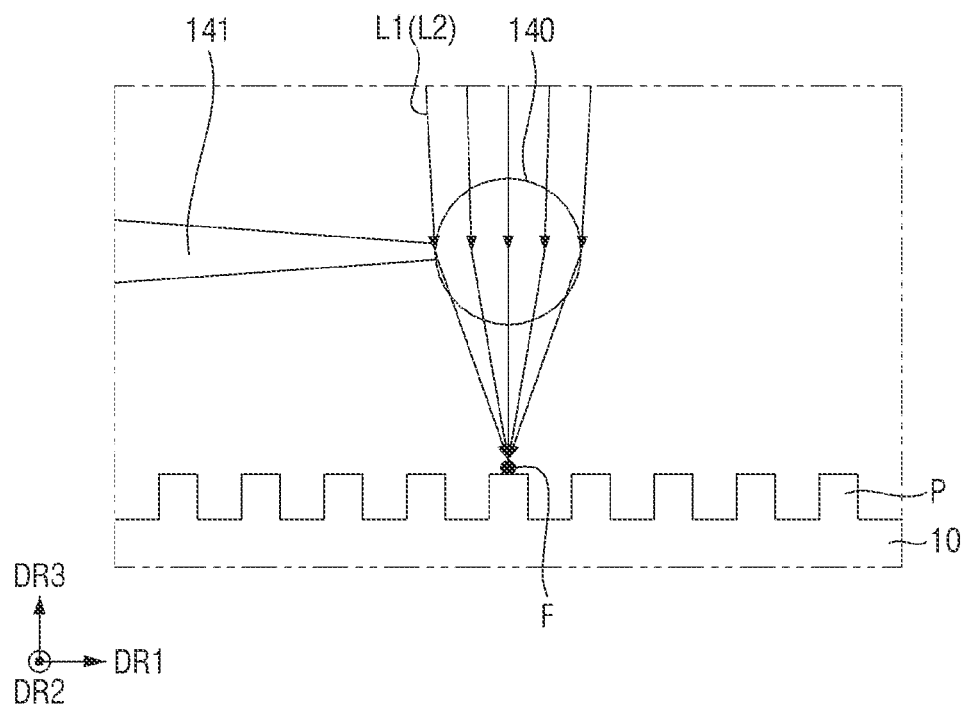
FIG. 3 is a view illustrating that light is condensed using a microsphere included in an apparatus for inspecting a substrate according to some embodiments of the present disclosure.

Referring to FIGS. 1 to 3, the apparatus for inspecting a substrate according to some embodiments of the present disclosure includes a stage 100, a light source 110, a beam splitter 120, an objective lens 130, an objective lens driving unit 135, a microsphere 140, a microsphere connection unit 141, a microsphere driving unit 145, a detector 150, a first lens 161, a second lens 162, a first polarizer 171, a second polarizer 172, and a controller 180.

The stage 100 may be disposed inside the apparatus for inspecting a substrate. A substrate 10 may be loaded on the stage 100. A semiconductor pattern P may be formed on an upper surface of the substrate 10.

The light source 110 may extract light having a desired wavelength from light having a plurality of wavelengths. For example, the light source 110 may extract first light L1 having a first wavelength from the light having a plurality of wavelengths. Also, the light source 110 may extract second light L2 having a second wavelength, different from the first wavelength, from the light having a plurality of wavelengths. The light source 110 may provide the first light L1 or the second light L2, which is extracted from the light having a plurality of wavelengths, to the substrate 10 disposed on the stage 100.

The beam splitter 120 may be disposed on a path through which the first light L1 and the second light L2 pass. The beam splitter 120 may reflect a portion of the first light L1 and a portion of the second light L2, which are provided from the light source 110, to provide the reflected light to the objective lens 130. Also, the beam splitter 120 may transmit the other portion of the first light L1 and the other portion of the second light L2, which are provided from the light source 110.

The first lens 161 may be disposed between the light source 110 and the beam splitter 120 on the path through which the first light L1 and the second light L2 pass. The first polarizer 171 may be disposed between the first lens 161 and the beam splitter 120 on the path through which the first light L1 and the second light L2 pass. That is, the first light L1 and the second light L2, which are provided from the light source 110, may sequentially pass through the first lens 161 and the first polarizer 171, and then may be provided to the beam splitter 120.

The first lens 161 may be, for example, a convex lens. The first lens 161 may change angular distribution of the first light L1 and the second light L2, which are provided from the light source 110, to provide the first light L1 and the second light L2 to the first polarizer 171. The first polarizer 171 may polarize each of the first light L1 and the second light L2, which are provided from the first lens 161, in one direction to provide the polarized light to the beam splitter 120.

The objective lens 130 may be disposed on an upper surface of the stage 100. In detail, the objective lens 130 may be disposed between the stage 100 and the beam splitter 120 on the path through which the first light L1 and the second light L2 pass. The first light L1 and the second light L2, which are provided from the beam splitter 120, may be condensed on the microsphere 140 by passing through the objective lens 130.

The objective lens driving unit 135 may be connected to the objective lens 130. The objective lens driving unit 135 may move the objective lens 130 in a vertical direction DR3. The objective lens driving unit 135 may be controlled by the controller 180.

The microsphere 140 may be disposed on the upper surface of the stage 100. In detail, the microsphere 140 may be disposed between the upper surface of the stage 100 and the objective lens 130. The microsphere 140 may be spaced apart from each of the objective lens 130 and the substrate 10 disposed on the stage 100.

The microsphere 140 may have a spherical shape, for example, but embodiments of the present disclosure are not limited thereto. The microsphere 140 may include a dielectric material having a refractive index of one or more. The microsphere 140 may include, for example, sodalime glass, but embodiments of the present disclosure are not limited thereto.

The first light L1 and the second light L2, which have passed through the microsphere 140, may be condensed on a focal point F to be formed on the substrate 10. The focal point F may be formed on a surface of the semiconductor pattern P formed on the substrate 10.

The microsphere 140 may have a diameter in the range of 1 μm to 100 μm in a first horizontal direction DR1 parallel with the upper surface of the stage 100, for example. For example, the diameter of the microsphere 140 may be about $\frac{1}{300}$ or less than the diameter of the objective lens 130. The microsphere 140 having a diameter relatively smaller than the diameter of the objective lens 130 may be used, such that the first light L1 and the second light L2, which are provided from the objective lens 130, may effectively be condensed on the focal point formed on the substrate 10.

The microsphere driving unit 145 may be connected to the microsphere 140 through the microsphere connection unit 141. For example, the microsphere driving unit 145 may move the microsphere 140 in a first horizontal direction DR1, a second horizontal direction DR2 perpendicular to the first horizontal direction DR1, and a vertical direction DR3 perpendicular to each of the first horizontal direction DR1 and the second horizontal direction DR2.

The microsphere connection unit 141 may have a conical shape extended in the first horizontal direction DR1, for example. A vertex portion of the microsphere connection unit 141 having a conical shape may be connected to the microsphere 140. The microsphere driving unit 145 may move the microsphere 140 in the vertical direction DR3. The microsphere driving unit 145 may be controlled by the controller 180.

After passing through the microsphere 140, the first light L1 and the second light L2 may be reflected on the focal point F. The first light L1 and the second light L2, which are reflected on the focal point F, may be defined as reflected light RL. The reflected light RL may be provided to the detector 150 by sequentially passing through the objective lens 130 and the beam splitter 120. The detector 150 may detect the reflected light RL to inspect the semiconductor pattern P formed on the substrate 10.

The second polarizer 172 may be disposed between the beam splitter 120 and the detector 150 on a path through which the reflected light RL passes. The second lens 162 may be disposed between the second polarizer 172 and the detector 150 on the path through which the reflected light RL passes. The reflected light RL reflected from the focal point F may be provided to the detector 150 by sequentially passing through the second polarizer 172 and the second lens 162.

The second polarizer 172 may polarize the reflected light RL provided from the beam splitter 120 in one direction to provide the polarized light to the second lens 162. The second lens 162 may be, for example, a convex lens. The second lens 162 may change an angular distribution of the reflected light RL provided from the second polarizer 172 and provide the changed angular distribution to the detector 150.

The controller 180 may receive information on the first wavelength of the first light L1 and information on the second wavelength of the second light L2.

For example, the controller 180 may acquire first position information on a pre-calculated focal point F in response to the first wavelength of the received first light L1. The first position information may include position information of the objective lens 130 in the vertical direction DR3 and position information of the microsphere 140 in the vertical direction DR3 so that the pre-calculated focal point F is formed on the surface of the semiconductor pattern P formed on the substrate 10 in response to the first wavelength of the first light L1.

For example, the controller 180 may acquire second position information on the pre-calculated focal point F in response to the second wavelength of the received second light L2. The second position information may include position information of the objective lens 130 in the vertical direction DR3 and position information of the microsphere 140 in the vertical direction DR3 so that the pre-calculated focal point F is formed on the surface of the semiconductor pattern P formed on the substrate 10 in response to the second wavelength of the second light L2.

The controller 180 may control each of the objective lens driving unit 135 and the microsphere driving unit 145 by using the first position information and the second position information. The controller 180 may control the objective lens driving unit 135 to adjust the position of the objective lens 130 in the vertical direction DR3. Further, the controller 180 may control the microsphere driving unit 145 to adjust the position of the microsphere 140 in the vertical direction DR3.

For example, the controller 180 may control the objective lens driving unit 135 by using the position information of the objective lens 130 in the vertical direction DR3, which is included in the first position information, to adjust the position of the objective lens 130 in the vertical direction DR3. Also, the controller 180 may control the microsphere driving unit 145 by using the position information of the microsphere 140 in the vertical direction DR3, which is included in the first position information, thereby adjusting the position of the microsphere 140 in the vertical direction DR3.

For example, the controller 180 may control the objective lens driving unit 135 by using the position information of the objective lens 130 in the vertical direction DR3, which is included in the second position information, to adjust the position of the objective lens 130 in the vertical direction DR3. Also, the controller 180 may control the microsphere driving unit 145 by using the position information of the microsphere 140 in the vertical direction DR3, which is included in the second position information, thereby adjusting the position of the microsphere 140 in the vertical direction DR3.

The controller 180 may control the position of each of the objective lens 130 and the microsphere 140 in the vertical direction DR3 by using the first position information, thereby condensing the first light L1 on the focal point F formed on the surface of the semiconductor pattern P. Also, the controller 180 may control the position of each of the objective lens 130 and the microsphere 140 in the vertical direction DR3 by using the second position information, thereby condensing the second light L2 on the focal point F formed on the surface of the semiconductor pattern P.

The apparatus for inspecting a substrate according to some embodiments of the present disclosure may improve reliability in inspection of the substrate 10 by additionally condensing the light L1 and L2 passing through the objective lens 130 on the substrate 10 using the microsphere 140 disposed between the stage 100 and the objective lens 130 at a diameter of about 1/300 or less than the diameter of the objective lens 130.

Hereinafter, a method for fabricating a semiconductor device according to some embodiments of the present disclosure will be described with reference to FIGS. 1 to 4.

Figure 4:
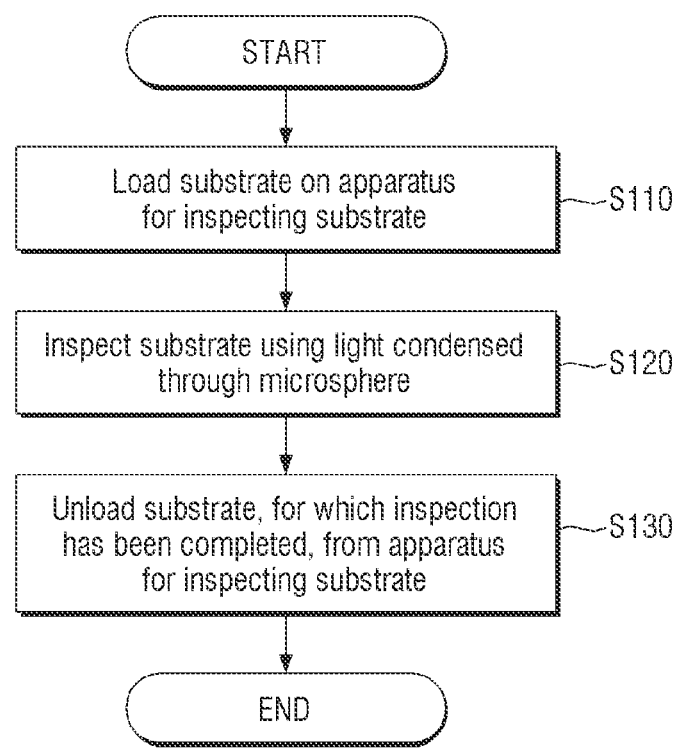
FIG. 4 is a flow chart illustrating a method for fabricating a semiconductor device using an apparatus for inspecting a substrate according to some embodiments of the present disclosure.

FIG. 4 is a flow chart illustrating a method for manufacturing a semiconductor device using an apparatus for inspecting a substrate according to some embodiments of the present disclosure.

Referring to FIGS. 1 to 4, the substrate 10 may be loaded on the apparatus for inspecting a substrate (S110). In detail, the substrate 10 may be loaded on the upper surface of the stage 100 disposed inside the apparatus for inspecting a substrate. The semiconductor pattern P may be formed on the upper surface of the substrate 10.

Inspection for the substrate 10 positioned on the upper surface of the stage 100 may be performed. The inspection for the substrate 10 may be performed by a method of inspecting the substrate 10 using the first light L1 and the second light L2 condensed through the microsphere 140 (S120). The method of inspecting a substrate will be described in detail with reference to the flow chart shown in FIG. 5.

After the inspection for the substrate 10 is completed, the substrate 10 for which the inspection is completed may be unloaded from the apparatus for inspecting a substrate (S130).

Hereinafter, the method of inspecting a substrate using the apparatus for inspecting a substrate according to some embodiments of the present disclosure will be described with reference to FIGS. 1 to 3 and 5.

Figure 5:
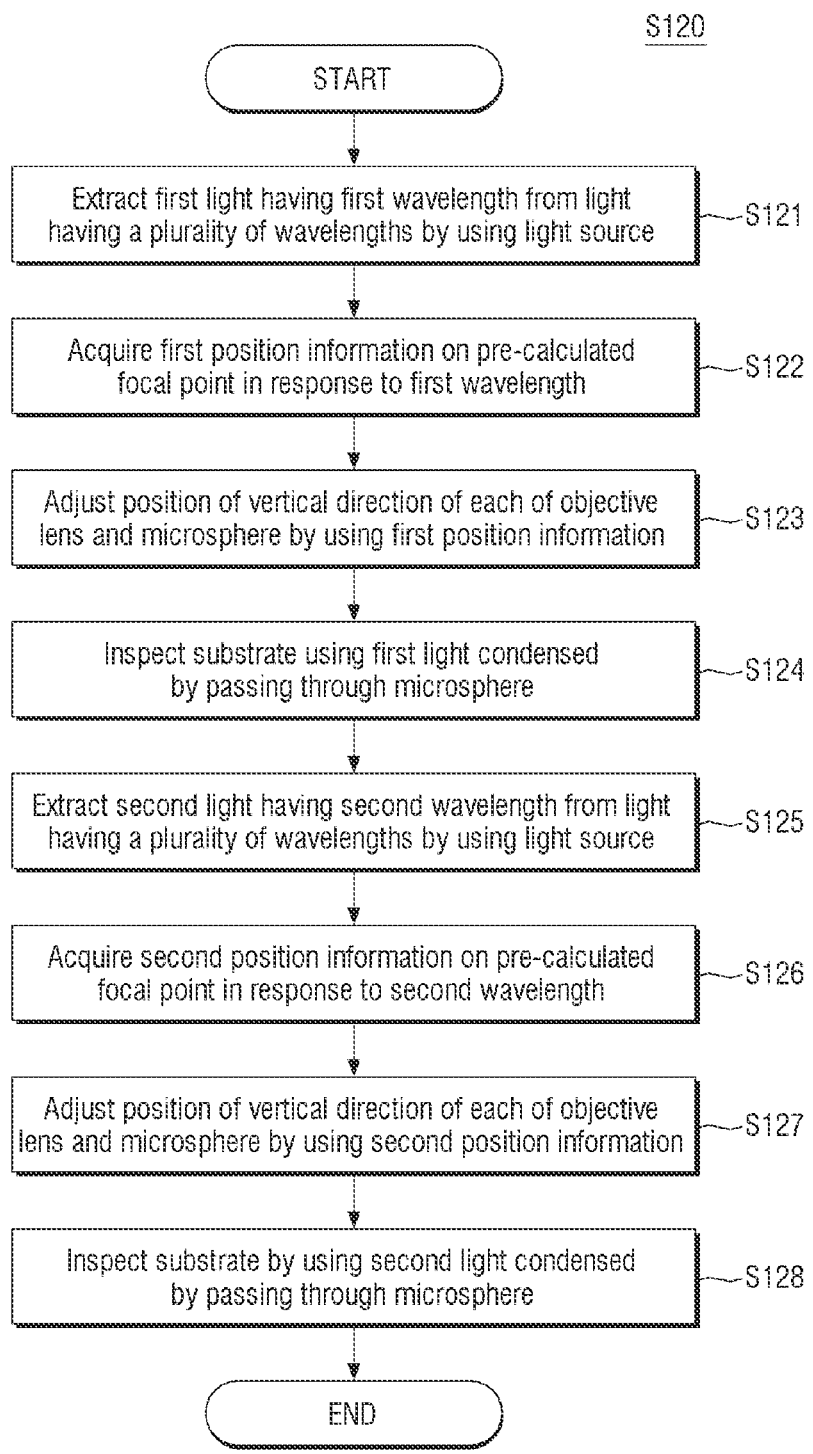
FIG. 5 is a flow chart illustrating a method of inspecting a substrate using an apparatus for inspecting a substrate according to some embodiments of the present disclosure.

FIG. 5 is a flow chart illustrating a method of inspecting a substrate using an apparatus for inspecting a substrate according to some embodiments of the present disclosure.

Referring to FIGS. 1 to 3 and 5, after the substrate 10 is loaded on the stage 100 disposed inside the apparatus for inspecting a substrate 10 (S110 in FIG. 4), the inspection S120 for the semiconductor pattern P formed on the substrate 10 may be performed.

After the substrate 10 is loaded on the stage 100, the light source 110 may extract the first light L1 having a first wavelength from the light having a plurality of wavelengths (S121). Information on the first wavelength of the first light L1 extracted from the light source 110 may be provided to the controller 180.

Subsequently, the controller 180 may acquire the first position information on the pre-calculated focal point F in response to the first wavelength of the first light L1 provided from the light source 110 (S122). The first position information may include position information of the objective lens 130 in the vertical direction DR3 and position information of the microsphere 140 in the vertical direction DR3 so that the pre-calculated focal point F is formed on the surface of the semiconductor pattern P formed on the substrate 10 in response to the first wavelength of the first light L1.

Subsequently, the controller 180 may adjust the position of each of the objective lens 130 and the microsphere 140 in the vertical direction DR3 by using the first position information (S123). In detail, the controller 180 may control the objective lens driving unit 135 to adjust the position of the objective lens 130 in the vertical direction DR3. Further, the controller 180 may control the microsphere driving unit 145 to adjust the position of the microsphere 140 in the vertical direction DR3.

Subsequently, the semiconductor pattern P formed on the substrate 10 may be inspected using the first light L1 condensed by passing through the microsphere 140 (S124). In detail, the first light L1 extracted from the light source 110 may be provided to the microsphere 140 by sequentially passing through the first lens 161, the first polarizer 171, the beam splitter 120, and the objective lens 130. The first light L1 may be condensed on the focal point F formed on the surface of the semiconductor pattern P by passing through the microsphere 140.

The first light L1 may be reflected on the focal point F formed on the surface of the semiconductor pattern P to form the reflected light RL. The reflected light RL may be provided to the detector 150 through the microsphere 140, the objective lens 130, the beam splitter 120, the second polarizer 172, and the second lens 162 sequentially. The detector 150 may inspect the semiconductor pattern P formed on the substrate 10 by using the reflected light RL.

After the inspection for the substrate 10 using the first light L1 is completed, the light source 110 may extract the second light L2 having a second wavelength from the light having a plurality of wavelengths (S125). Information on the second wavelength of the second light L2 extracted from the light source 110 may be provided to the controller 180.

Subsequently, the controller 180 may acquire second position information on the pre-calculated focal point F in response to the second wavelength of the second light L2 provided from the light source 110 (S126). The second position information may include position information of the objective lens 130 in the vertical direction DR3 and position information of the microsphere 140 in the vertical direction DR3 so that the pre-calculated focal point F is formed on the surface of the semiconductor pattern P formed on the substrate 10 in response to the second wavelength of the second light L2.

Subsequently, the controller 180 may adjust the position of each of the objective lens 130 and the microsphere 140 in the vertical direction DR3 by using the second position information (S127). In detail, the controller 180 may control the objective lens driving unit 135 to adjust the position of the objective lens 130 in the vertical direction DR3. Further, the controller 180 may control the microsphere driving unit 145 to adjust the position of the microsphere 140 in the vertical direction DR3.

Subsequently, the semiconductor pattern P formed on the substrate 10 may be inspected using the second light L2 condensed by passing through the microsphere 140 (S128). In detail, the second light L2 extracted from the light source 110 may be provided to the microsphere 140 by sequentially passing through the first lens 161, the first polarizer 171, the beam splitter 120, and the objective lens 130. The second light L2 may be condensed on the focal point F formed on the surface of the semiconductor pattern P by passing through the microsphere 140.

The second light L2 may be reflected on the focal point F formed on the surface of the semiconductor pattern P to form the reflected light RL. The reflected light RL may be provided to the detector 150 through the microsphere 140, the objective lens 130, the beam splitter 120, the second polarizer 172, and the second lens 162 sequentially. The detector 150 may inspect the semiconductor pattern P formed on the substrate 10 by using the reflected light RL.

Although FIG. 5 illustrates that the semiconductor pattern P formed on the substrate 10 is inspected over twice using the first light L1 and the second light L2, which have their respective wavelengths different from each other, embodiments of the present disclosure are not limited thereto. That is, in some other embodiments, the semiconductor pattern P formed on the substrate 10 may be inspected by sequentially using three or more kinds of light, which have different wavelengths extracted from the light source 110.

Hereinafter, an apparatus for inspecting a substrate according to some other embodiments of the present disclosure will be described with reference to FIG. 6. The following description will be based on a difference from the apparatus for inspecting a substrate shown in FIGS. 1 to 3.

Figure 6:
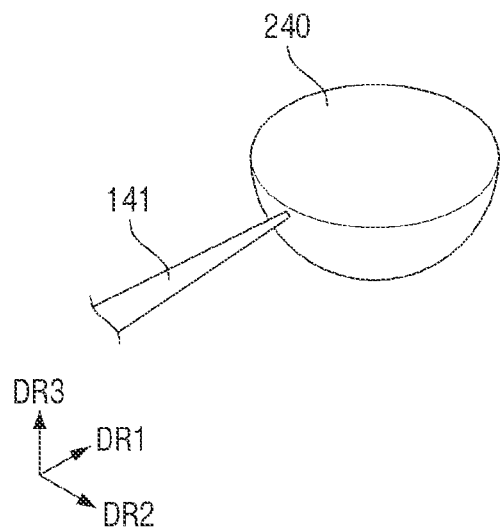
FIG. 6 is a view illustrating a microsphere included in an apparatus for inspecting a substrate according to some other embodiments of the present disclosure.

FIG. 6 is a view illustrating a microsphere included in an apparatus for inspecting a substrate according to some other embodiments of the present disclosure.

Referring to FIG. 6, in the apparatus for inspecting a substrate according to some other embodiments of the present disclosure, the microsphere 240 may have a hemispherical shape. For example, the microsphere 240 may have a hemispherical shape with a flat upper surface facing the objective lens 130 (FIG. 1). The microsphere 240 may be connected to the microsphere connection unit 141 that is extended in the first horizontal direction DR1.

Hereinafter, an apparatus for inspecting a substrate according to some other embodiments of the present disclosure will be described with reference to FIG. 7. The following description will be based on a difference from the apparatus for inspecting a substrate shown in FIGS. 1 to 3.

Figure 7:
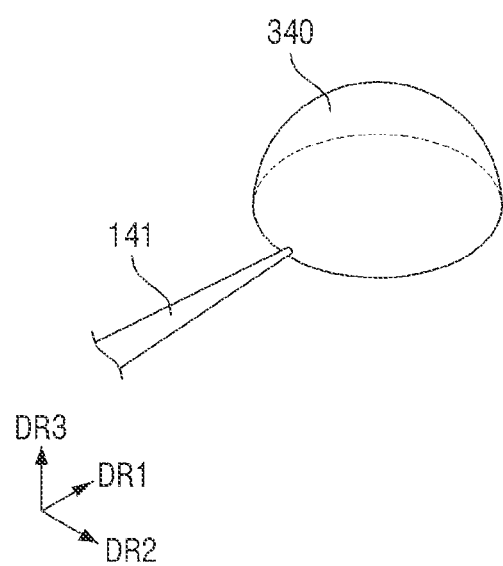
FIG. 7 is a view illustrating a microsphere included in an apparatus for inspecting a substrate according to some other embodiments of the present disclosure.

FIG. 7 is a view illustrating a microsphere included in an apparatus for inspecting a substrate according to some other embodiments of the present disclosure.

Referring to FIG. 7, in the apparatus for inspecting a substrate according to some other embodiments of the present disclosure, the microsphere 340 may have a hemispherical shape. For example, the microsphere 340 may have a hemispherical shape with a flat lower surface facing the stage 100 (FIG. 1). The microsphere 340 may be connected to the microsphere connection unit 141 that is extended in the first horizontal direction DR1.

Hereinafter, an apparatus for inspecting a substrate according to some other embodiments of the present disclosure will be described with reference to FIG. 8. The following description will be based on a difference from the apparatus for inspecting a substrate shown in FIGS. 1 to 3.

Figure 8:
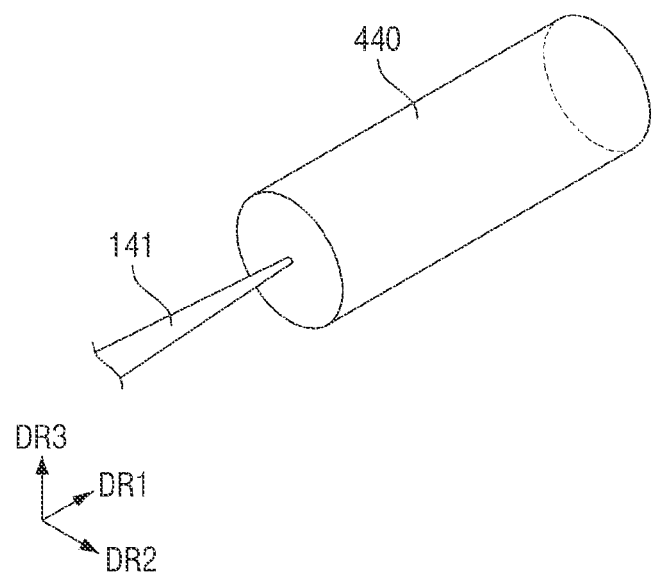
FIG. 8 is a view illustrating a microsphere included in an apparatus for inspecting a substrate according to some other embodiments of the present disclosure.

FIG. 8 is a view illustrating a microsphere included in an apparatus for inspecting a substrate according to some other embodiments of the present disclosure.

Referring to FIG. 8, in the apparatus for inspecting a substrate according to some other embodiments of the present disclosure, the microsphere 440 may have a cylindrical shape. For example, the microsphere 440 may have a cylindrical shape extended in the first horizontal direction DR1. The microsphere 440 may be connected to the microsphere connection unit 141 that is extended in the first horizontal direction DR1.

Hereinafter, a method of inspecting a substrate using an apparatus for inspecting a substrate according to some other embodiments of the present disclosure will be described with reference to FIGS. 1 to 3 and 9. The following description will be based on a difference from the method of inspecting a substrate shown in FIG. 5.

Figure 9:
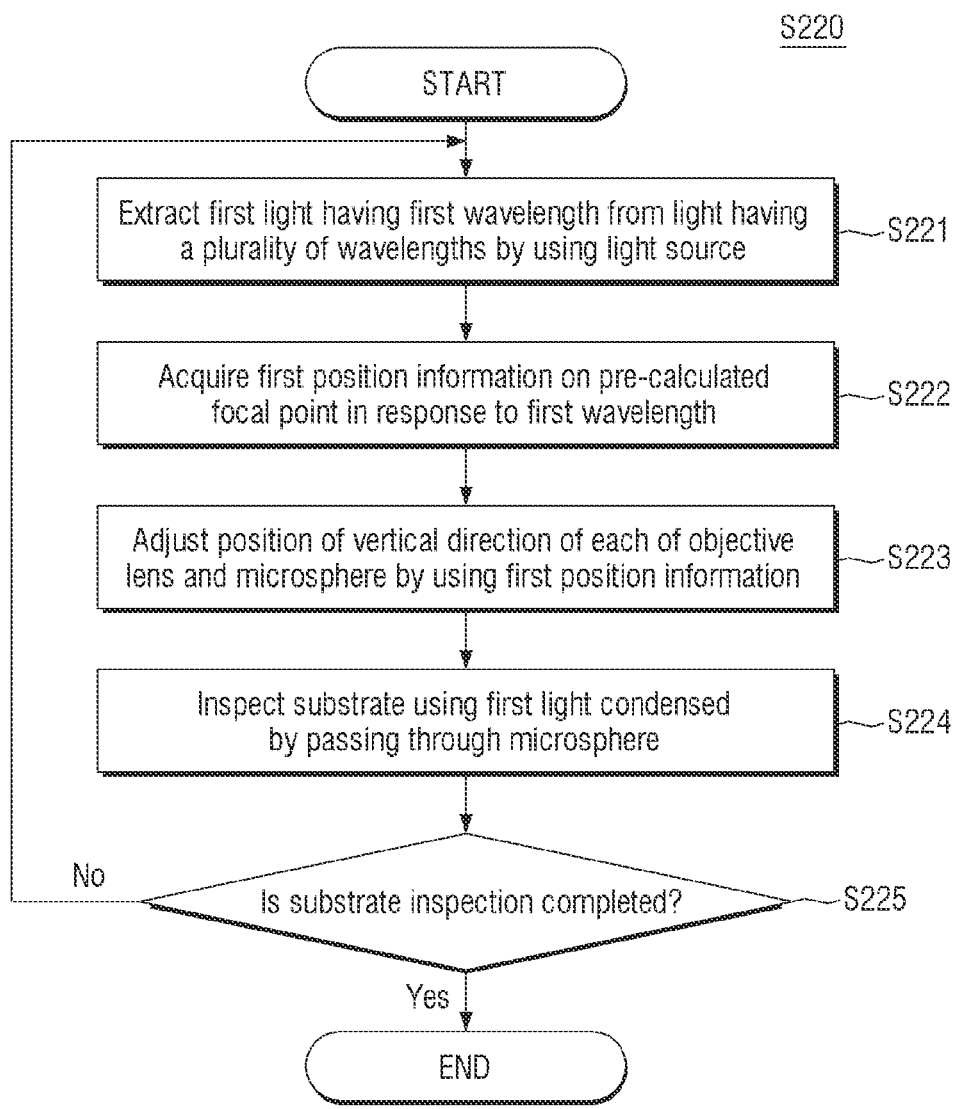
FIG. 9 is a flow chart illustrating a method of inspecting a substrate using an apparatus for inspecting a substrate according to some other embodiments of the present disclosure.

FIG. 9 is a flow chart illustrating a method of inspecting a substrate using an apparatus for inspecting a substrate according to some other embodiments of the present disclosure.

Referring to FIGS. 1 to 3 and 9, after the substrate 10 is loaded on the stage 100 disposed inside the apparatus for inspecting a substrate (S110 in FIG. 4), an inspection (S220) for the semiconductor pattern P formed on the substrate 10 may be performed.

After the substrate 10 is loaded on the stage 100, the light source 110 may extract the first light L1 having a first wavelength from the light having a plurality of wavelengths (S221). Then, the controller 180 may acquire first position information on the pre-calculated focal point F in response to the first wavelength of the first light L1 provided from the light source 110 (S222).

Subsequently, the controller 180 may adjust the position of each of the objective lens 130 and the microsphere 140 in the vertical direction DR3 by using the first position information (S223). Subsequently, the semiconductor pattern P formed on the substrate 10 may be inspected using the first light L1 condensed by passing through the microsphere 140 (S224).

Subsequently, it may be determined whether the inspection for the substrate 10 has been finally completed (S225). When the inspection of the substrate 10 is finally completed, the inspection for the substrate 10 may end, and the substrate 10 for which the inspection has been completed may be unloaded from the apparatus for inspecting a substrate (S130 of FIG. 4).

When the inspection for the substrate 10 is not finally completed, the step S221 of extracting the first light L1 having a first wavelength from the light having a plurality of wavelengths by the light source 110, the step S222 of acquiring the first position information on the pre-calculated focal point F in response to the first wavelength of the first light L1 provided from the light source 110, the step S223 of adjusting the position of each of the objective lens 130 and the microsphere 140 in the vertical direction DR3 by using the first position information, and the step S224 of inspecting the semiconductor pattern P formed on the substrate 10 by using the first light L1 condensed by passing through the microsphere 140 may be performed repeatedly.

Hereinafter, an apparatus for inspecting a substrate according to some other embodiments of the present disclosure will be described with reference to FIGS. 10 to 12. The following description will be based on a difference from the apparatus for inspecting a substrate shown in FIGS. 1 to 3.

Figure 10:
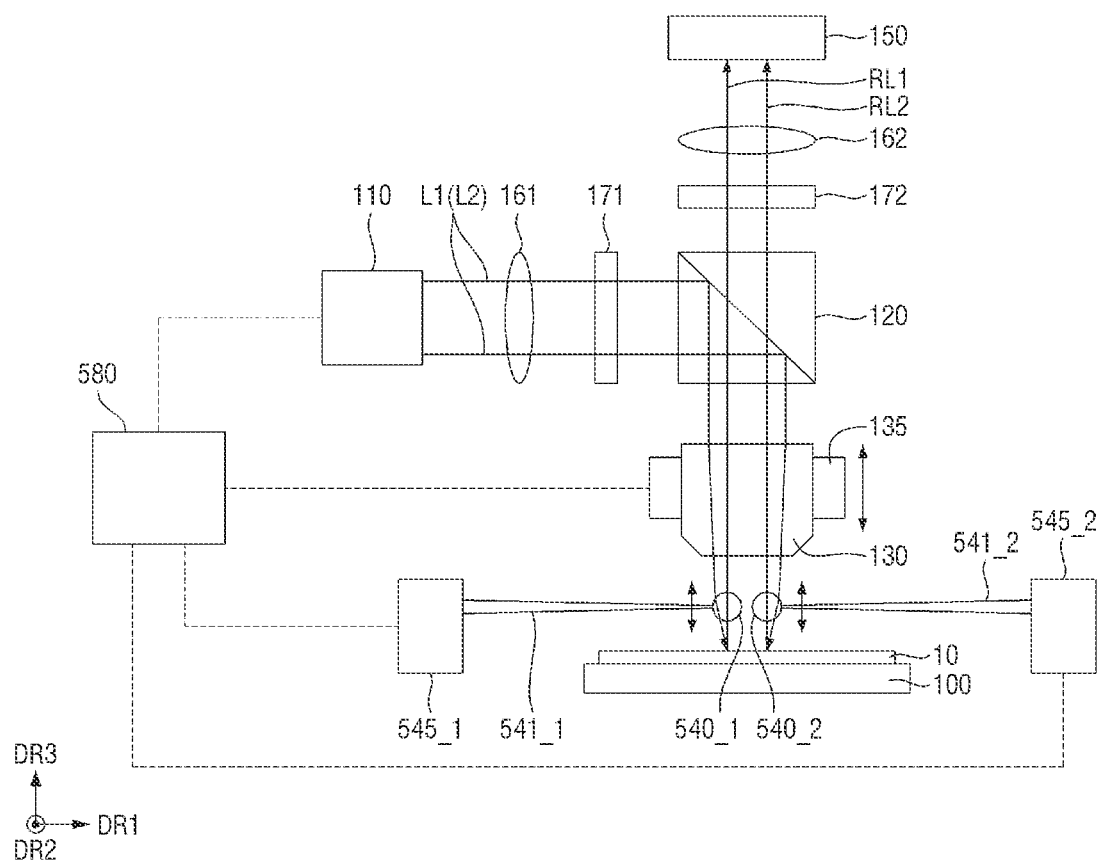
FIG. 10 is a view illustrating an apparatus for inspecting a substrate according to some other embodiments of the present disclosure.

FIG. 10 is a view illustrating an apparatus for inspecting a substrate according to some other embodiments of the present disclosure. FIG. 11 is a plan view illustrating a plurality of microspheres included in an apparatus for inspecting a substrate according to some other embodiments of the present disclosure. FIG. 12 is a view illustrating that light is condensed using a microsphere included in an apparatus for inspecting a substrate according to some other embodiments of the present disclosure.

Figure 11:
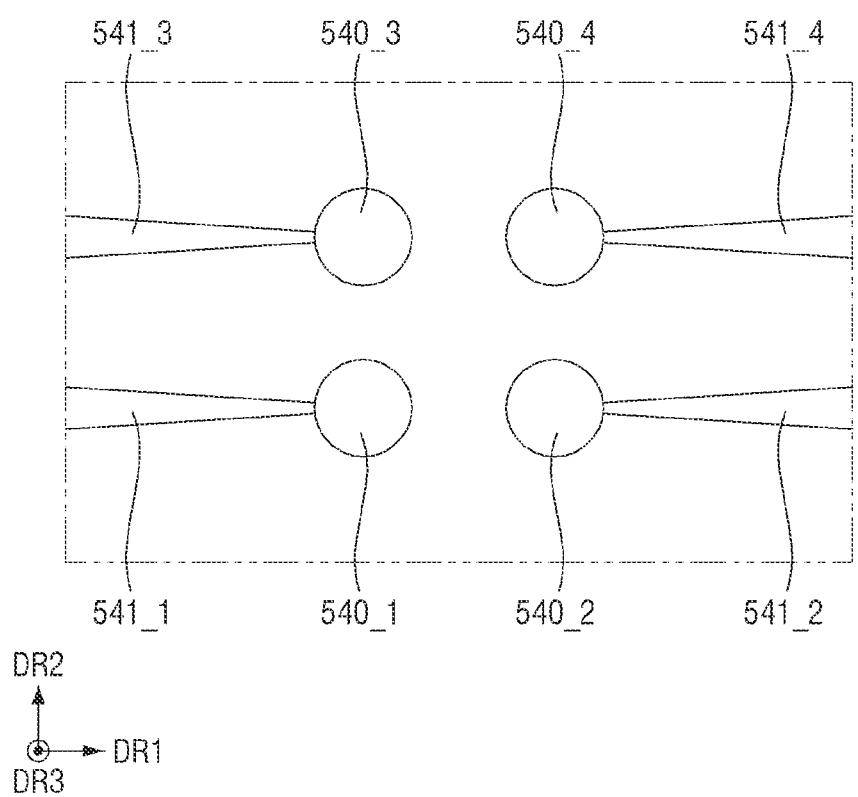
FIG. 11 is a plan view illustrating a plurality of microspheres included in an apparatus for inspecting a substrate according to some other embodiments of the present disclosure.
Figure 12:
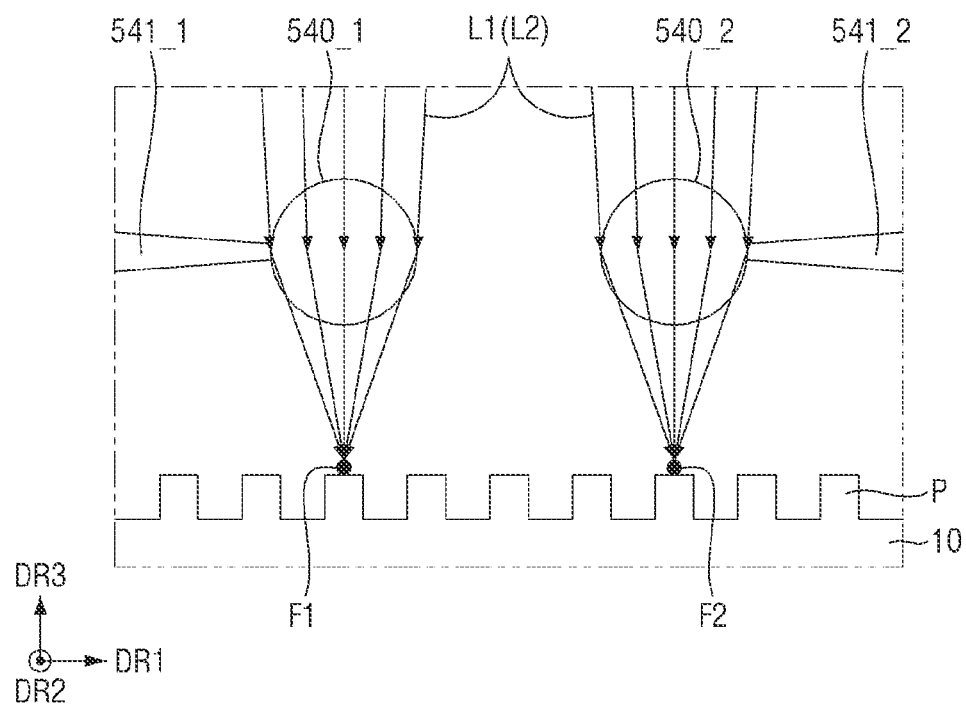
FIG. 12 is a view illustrating that light is condensed using a microsphere included in an apparatus for inspecting a substrate according to some other embodiments of the present disclosure.

Referring to FIGS. 10 to 12, in the apparatus for inspecting a substrate according to some other embodiments of the present disclosure, a plurality of microspheres may be disposed between the upper surface of the stage 100 and the objective lens 130.

For example, a first microsphere 540_1, a second microsphere 540_2, a third microsphere 540_3, and a fourth microsphere 540_4 spaced apart from one another may be disposed between the upper surface of the stage 100 and the objective lens 130. The second microsphere 540_2 may be spaced apart from the first microsphere 540_1 in the first horizontal direction DR1. The third microsphere 540_3 and the fourth microsphere 540_4 may respectively be spaced apart from the first microsphere 540_1 and the second microsphere 540_2 in the second horizontal direction DR2. Although FIG. 11 illustrates that four microspheres are disposed between the upper surface of the stage 100 and the objective lens 130, this is an example, and there is no limitation in the number of microspheres disposed between the upper surface of the stage 100 and the objective lens 130.

For example, the first microsphere 540_1 may be connected to a first microsphere driving unit 545_1 through a first microsphere connection unit 541_1. The second microsphere 540_2 may be connected to a second microsphere driving unit 545_2 through a second microsphere connection unit 541_2. The third microsphere 540_3 may be connected to the first microsphere driving unit 545_1 (or a third microsphere driving unit) through a third microsphere connection unit 541_3. The fourth microsphere 540_4 may be connected to the second microsphere driving unit 545_2 (or a fourth microsphere driving unit) through a fourth microsphere connection unit 541_4. The connection relationship between the first to fourth microspheres 540_1, 540_2, 540_3 and 540_4 and the first and second microsphere driving units 545_1 and 545_2 is an example, and embodiments of the present disclosure are not limited thereto.

A controller 580 may control the position of each of the first microsphere driving unit 545_1 and the second microsphere driving unit 545_2 (and the third and fourth driving units in some embodiments) in the vertical direction DR3 to adjust the position of each of the first microsphere 540_1, the second microsphere 540_2, the third microsphere 540_3, and the fourth microsphere 540_4 in the vertical direction DR3.

For example, a portion of each of the first light L1 and the second light L2, which are extracted from the light source 110, may be provided to the first microsphere 540_1 by passing through the objective lens 130. Another portion of each of the first light L1 and the second light L2, which are extracted from the light source 110, may be provided to the second microsphere 540_2 by passing through the objective lens 130.

The first light L1 and the second light L2, which have passed through the first microsphere 540_1, may be condensed on a first focal point F1 formed on the surface of the semiconductor pattern P. The first light L1 and the second light L2, which have passed through the second microsphere 540_2, may be condensed on a second focal point F2 formed by being spaced apart from the first focal point F1 in the first horizontal direction DR1 on the surface of the semiconductor pattern P. Each of first reflected light RL1, formed by being reflected on the first focal point F1, and second reflected light RL2, formed by being reflected on the second focal point F2, may be provided to the detector 150.

Hereinafter, an apparatus for inspecting a substrate according to some other embodiments of the present disclosure will be described with reference to FIG. 13. The following description will be based on a difference from the apparatus for inspecting a substrate shown in FIGS. 1 to 3.

Figure 13:
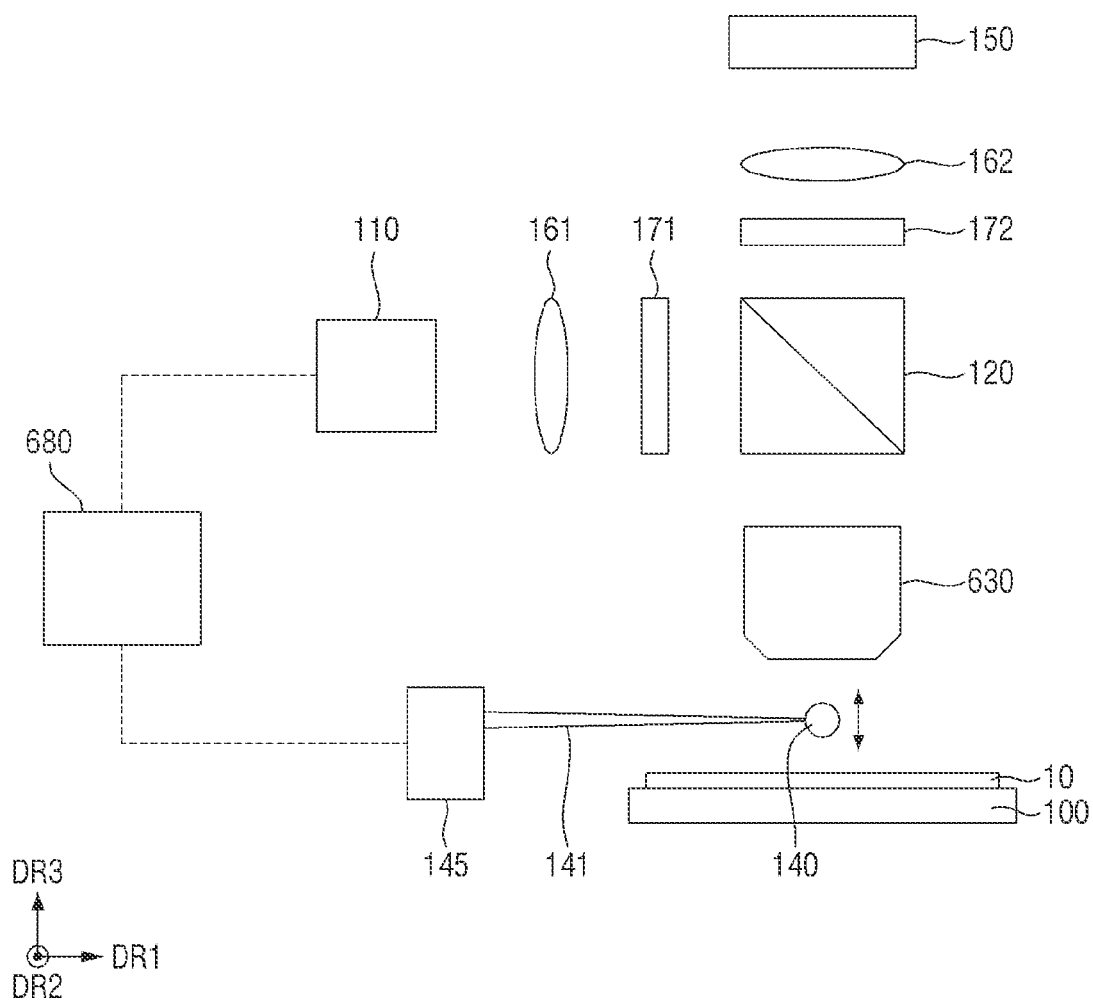
FIG. 13 is a view illustrating an apparatus for inspecting a substrate according to some other embodiments of the present disclosure.

FIG. 13 is a view illustrating an apparatus for inspecting a substrate according to some other embodiments of the present disclosure.

Referring to FIG. 13, in the apparatus for inspecting a substrate according to some other embodiments of the present disclosure, an inspection for the semiconductor pattern P formed on the substrate 10 may be performed in a state that an objective lens 630 is fixed. A controller 680 may control the microsphere driving unit 145 to adjust the position of the microsphere 140 in the vertical direction DR3.

Hereinafter, a method of inspecting a substrate using the apparatus for inspecting a substrate shown in FIG. 13 will be described with reference to FIGS. 13 and 14. The following description will be based on a difference from the method of inspecting a substrate shown in FIG. 5.

Figure 14:
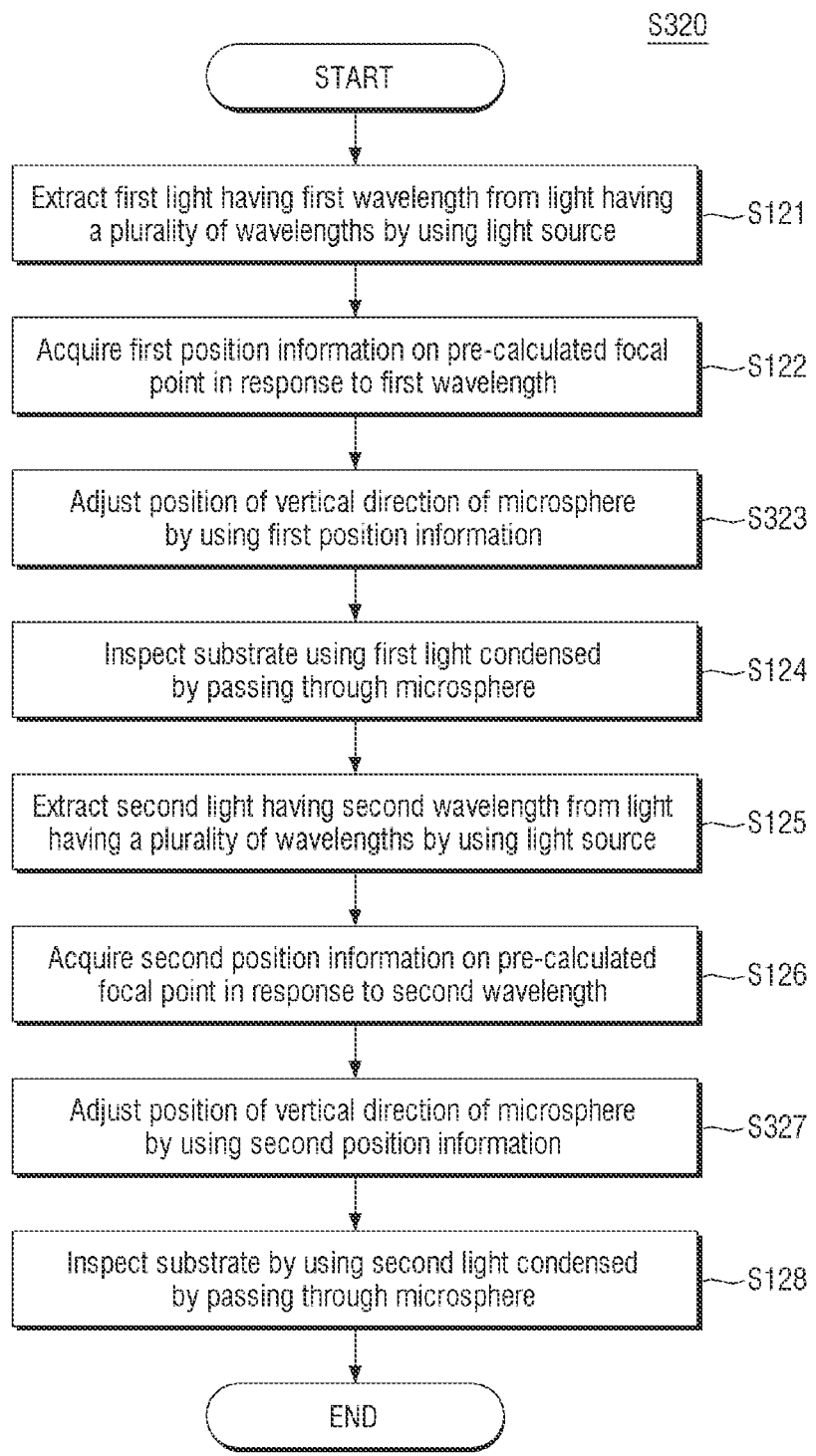
FIG. 14 is a flow chart illustrating a method of inspecting a substrate using an apparatus for inspecting a substrate according to some other embodiments of the present disclosure.

FIG. 14 is a flow chart illustrating a method of inspecting a substrate using an apparatus for inspecting a substrate according to some other embodiments of the present disclosure.

Referring to FIGS. 13 and 14, after the substrate 10 is loaded on the stage 100 disposed inside the apparatus for inspecting a substrate (S110 in FIG. 4), the light source 110 may extract the first light L1 having a first wavelength from the light having a plurality of wavelengths (S121). Then, the controller 680 may acquire the first position information on the pre-calculated focal point F (FIG. 3) in response to the first wavelength of the first light L1 provided from the light source 110 (S122).

Subsequently, the controller 680 may adjust the position of the microsphere 140 in the vertical direction DR3 by using the first position information (S323). In this case, the objective lens 630 may be fixed. Subsequently, the semiconductor pattern P (FIG. 3) formed on the substrate 10 may be inspected using the first light L1 condensed by passing through the microsphere 140 (S124).

After the inspection for the substrate 10 using the first light L1 is completed, the light source 110 may extract the second light L2 having a second wavelength from the light having a plurality of wavelengths (S125). Then, the controller 680 may acquire second position information on the pre-calculated focal point F (FIG. 3) in response to the second wavelength of the second light L2 provided from the light source 110 (S126).

Subsequently, the controller 680 may adjust the position of the microsphere 140 in the vertical direction DR3 by using the second position information (S327). In this case, the objective lens 630 may be fixed. Then, the semiconductor pattern P (FIG. 3) formed on the substrate 10 may be inspected using the second light L2 condensed by passing through the microsphere 140 (S128).

Hereinafter, an apparatus for inspecting a substrate according to some other embodiments of the present disclosure will be described with reference to FIG. 15. The following description will be based on a difference from the apparatus for inspecting a substrate shown in FIGS. 1 to 3.

Figure 15:
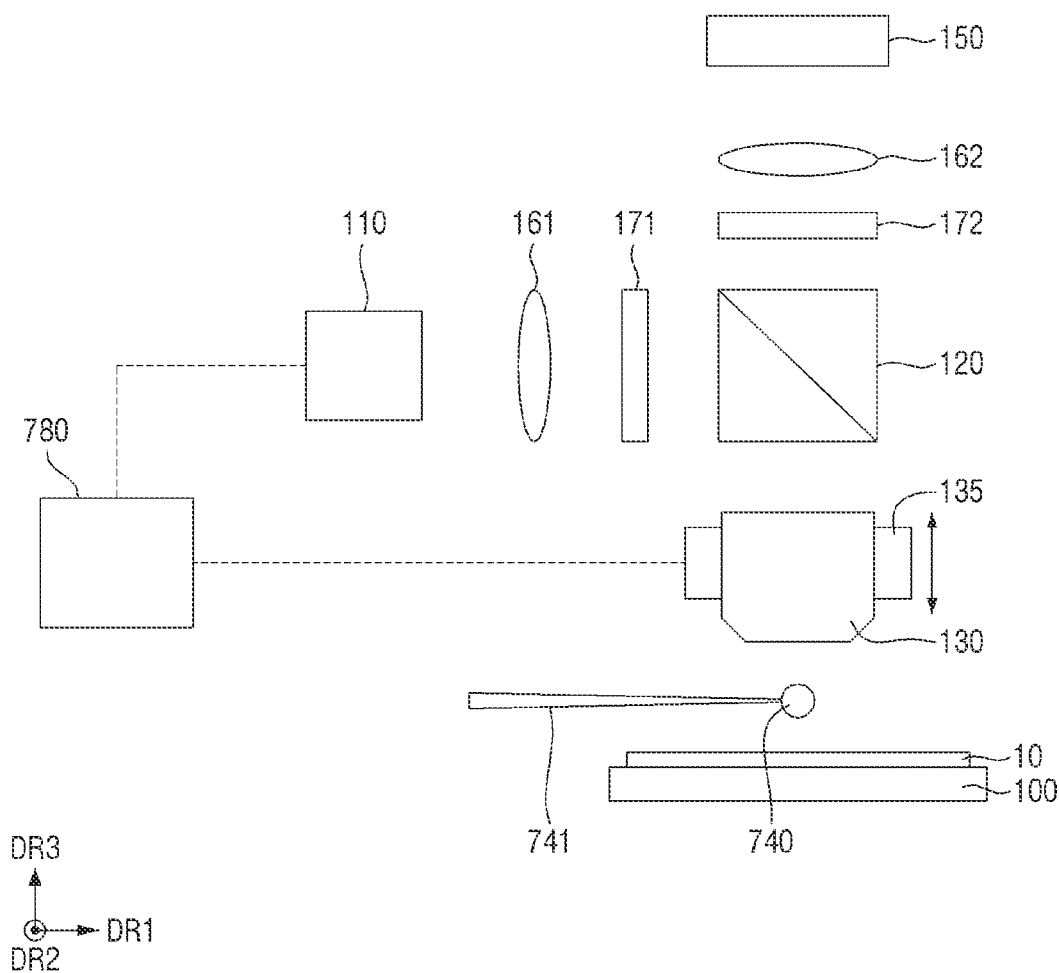
FIG. 15 is a view illustrating an apparatus for inspecting a substrate according to some other embodiments of the present disclosure.

FIG. 15 is a view illustrating an apparatus for inspecting a substrate according to some other embodiments of the present disclosure.

Referring to FIG. 15, in the apparatus for inspecting a substrate according to some other embodiments of the present disclosure, an inspection for the semiconductor pattern P (FIG. 3) formed on the substrate 10 may be performed in a state that a microsphere 740 is fixed. The microsphere 740 may be fixed by being connected to a microsphere connection unit 741. A controller 780 may control the objective lens driving unit 135 to adjust the position of the objective lens 130 in the vertical direction DR3.

Hereinafter, a method of inspecting a substrate using the apparatus for inspecting a substrate shown in FIG. 15 will be described with reference to FIGS. 15 and 16. The following description will be based on a difference from the method of inspecting a substrate shown in FIG. 5.

Figure 16:
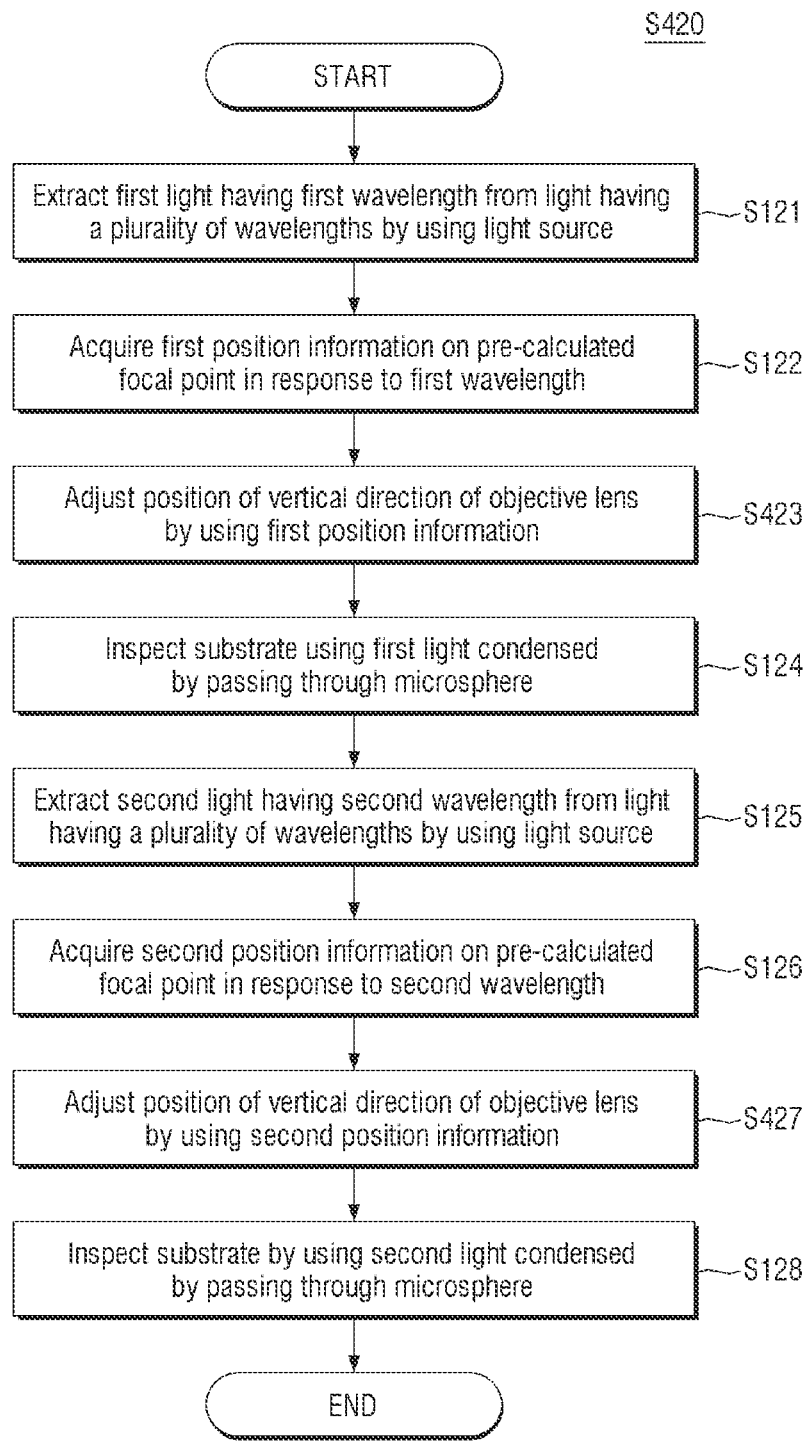
FIG. 16 is a flow chart illustrating a method of inspecting a substrate using an apparatus for inspecting a substrate according to some other embodiments of the present disclosure.

FIG. 16 is a flow chart illustrating a method of inspecting a substrate using an apparatus for inspecting a substrate according to some other embodiments of the present disclosure.

Referring to FIGS. 15 and 16, after the substrate 10 is loaded on the stage 100 disposed inside the apparatus for inspecting a substrate (S110 in FIG. 4), the light source 110 may extract the first light L1 having a first wavelength from the light having a plurality of wavelengths (S121). Then, the controller 780 may acquire the first position information on the pre-calculated focal point F (FIG. 3) in response to the first wavelength of the first light L1 provided from the light source 110 (S122).

Subsequently, the controller 780 may adjust the position of the objective lens 130 in the vertical direction DR3 by using the first position information (S423). In this case, the microsphere 740 may be fixed. Then, the semiconductor pattern P (FIG. 3) formed on the substrate 10 may be inspected using the first light L1 condensed by passing through the objective lens 130 (S124).

After the inspection for the substrate 10 using the first light L1 is completed, the light source 110 may extract the second light L2 having a second wavelength from the light having a plurality of wavelengths (S125). Then, the controller 780 may acquire the second position information on the pre-calculated focal point F (FIG. 3) in response to the second wavelength of the second light L2 provided from the light source 110 (S126).

Subsequently, the controller 780 may adjust the position of the objective lens 130 in the vertical direction DR3 by using the second position information (S427). In this case, the microsphere 740 may be fixed. Then, the semiconductor pattern P (FIG. 3) formed on the substrate 10 may be inspected using the second light L2 condensed by passing through the objective lens 130 (S128).

According to embodiments, driving units of the present disclosure may include an actuator (e.g. a motor) configured to cause driving of one or more components. For example, each objective lens driving unit may include an actuator that is configured to cause driving of at least one objective lens in the vertical direction, based on control by a controller. Also, each microsphere driving unit may include an actuator that is configured to cause driving of at least one microsphere in the vertical direction, based on control by a controller.

According to embodiments, controllers (e.g. controller 180) of the present disclosure may include at least one processor and memory storing computer instructions. The computer instructions, when executed by the at least one processor, may be configured to cause the controller to perform its functions.

Although non-limiting example embodiments according to the present disclosure have been described with reference to the accompanying drawings, embodiments of the present disclosure can be provided in various forms without being limited to the above-described example embodiments, and the person with ordinary skill in the art to which the present disclosure pertains can understand that embodiments of the present disclosure can be provided in other specific forms without departing from technical spirits of the present disclosure. Thus, the above-described embodiments are to be considered in all respects as illustrative and not restrictive.

What is claimed is:

1. An apparatus for inspecting a substrate, the apparatus comprising:
   a stage on which the substrate is configured to be loaded;
   a light source configured to extract a first light having a first wavelength from a light having a plurality of wavelengths, and provide the first light to the substrate;
   an objective lens disposed on an upper surface of the stage and configured to allow the first light to pass therethrough;
   at least one microsphere disposed between the upper surface of the stage and the objective lens, the at least one microsphere configured to allow the first light provided from the objective lens to pass therethrough, and to condense the first light on the substrate;
   a detector configured to detect a reflected light formed by the first light reflected from the substrate to inspect the substrate; and
   a controller configured to control a position of at least one from among the objective lens and the at least one microsphere in a vertical direction such that the first light is condensed on at least one focal point formed on the substrate,
   wherein the controller is further configured to:
      acquire information on the first wavelength of the first light extracted by the light source,
      acquire first position information on the at least one focal point, which is pre-calculated, based on the first wavelength, and
      control the position of at least one from among the objective lens and the at least one microsphere in the vertical direction by using the first position information.

2. The apparatus of claim 1, further comprising an objective lens driving unit that comprises an actuator and is configured to move the objective lens in the vertical direction based on control by the controller.

3. The apparatus of claim 1, further comprising at least one microsphere driving unit that comprises an actuator and is configured to move the at least one microsphere in the vertical direction based on control by the controller.

4. The apparatus of claim 1, wherein the at least one microsphere is spaced apart from each of the objective lens and the substrate.

5. The apparatus of claim 1, wherein the at least one microsphere has a spherical shape.

6. The apparatus of claim 1, wherein the at least one microsphere has a hemispherical shape.

7. The apparatus of claim 1, wherein the at least one microsphere has a cylindrical shape extended in a horizontal direction parallel with the upper surface of the stage.

8. The apparatus of claim 1, wherein the controller is further configured to:
   acquire information on a second wavelength of a second light extracted by the light source, acquire second position information on the at least one focal point, which is pre-calculated, based on the second wavelength, and control the position of at least one from among the objective lens and the at least one microsphere in the vertical direction by using the second position information.

9. The apparatus of claim 1, wherein the at least one microsphere comprises a first microsphere and a second microsphere that are spaced apart from each other in a horizontal direction parallel with the upper surface of the stage, the at least one focal point comprises a first focal point and a second focal point that are spaced apart from each other in the horizontal direction, and a portion of the first light is condensed on the first focal point by passing through the first microsphere and another portion of the first light is condensed on the second focal point by passing through the second microsphere.

10. The apparatus of claim 1, wherein the at least one microsphere has a diameter ranging from 1 μm to 100 μm in a horizontal direction parallel with the upper surface of the stage.

11. An apparatus for inspecting a substrate comprising:
a stage on which the substrate is configured to be loaded;
a light source configured to extract a first light having a first wavelength from a light having a plurality of wavelengths, and provide the first light to the substrate;
an objective lens disposed on an upper surface of the stage and configured to allow the first light to pass therethrough;
an objective lens driving unit that comprises an actuator and is configured to move the objective lens in a vertical direction;
a microsphere, that has a spherical shape, disposed between the upper surface of the stage and the objective lens, the microsphere configured to allow the first light provided from the objective lens to pass therethrough, and to condense the first light on the substrate;
a microsphere driving unit that comprises an actuator and is configured to move the microsphere in the vertical direction;
a detector configured to detect a reflected light formed by the first light reflected from the substrate to inspect the substrate; and
a controller configured to control a position of each of the objective lens and the microsphere in the vertical direction by controlling the objective lens driving unit and the microsphere driving unit such that the first light is condensed on a focal point formed on the substrate,
wherein the controller is further configured to:
acquire information on the first wavelength of the first light extracted by the light source,
acquire first position information on the focal point, which is pre-calculated, based on the first wavelength, and
control the position of at least one from among the objective lens and the microsphere in the vertical direction by using the first position information.

12. The apparatus of claim 11, wherein the controller is further configured to:
acquire information on a second wavelength of a second light extracted by the light source,
acquire second position information on the focal point, which is pre-calculated, based on the second wavelength, and
control the position of at least one from among the objective lens and the microsphere in the vertical direction by using the second position information.

13. An apparatus for inspecting a substrate, the apparatus comprising:
a stage on which the substrate is configured to be loaded;
a light source configured to extract a first light having a first wavelength from a light having a plurality of wavelengths, and provide the first light to the substrate;
an objective lens disposed on an upper surface of the stage and configured to allow the first light to pass therethrough;
at least one microsphere disposed between the upper surface of the stage and the objective lens, the at least one microsphere configured to allow the first light provided from the objective lens to pass therethrough, and to condense the first light on the substrate, the at least one microsphere is spaced apart from each of the objective lens and the substrate;
a microsphere driving unit that comprises an actuator and is configured to move the microsphere in a vertical direction; and
a controller configured to control a position of the at least one microsphere in the vertical direction such that the first light is condensed on at least one focal point formed on the substrate,
wherein the controller is further configured to:
acquire information on the first wavelength of the first light extracted by the light source,
acquire first position information on the at least one focal point, which is pre-calculated, based on the first wavelength, and
control the position of the at least one microsphere in the vertical direction by using the first position information.

14. The apparatus of claim 13, wherein the at least one microsphere has a spherical shape.

15. The apparatus of claim 13, further comprising an objective lens driving unit that comprises an actuator and is configured to move the objective lens in the vertical direction based on control by the controller.

16. The apparatus of claim 13, wherein the controller is further configured to:
acquire information on a second wavelength of a second light extracted by the light source,
acquire second position information on the at least one focal point, which is pre-calculated, based on the second wavelength, and
control the position of the at least one microsphere in the vertical direction by using the second position information.

17. The apparatus of claim 13, wherein the at least one microsphere comprises a first microsphere and a second microsphere that are spaced apart from each other in a horizontal direction parallel with the upper surface of the stage, the at least one focal point comprises a first focal point and a second focal point that are spaced apart from each other in the horizontal direction, and a portion of the first light is condensed on the first focal point by passing through the first microsphere and another portion of the first light is condensed on the second focal point by passing through the second microsphere.

18. The apparatus of claim 13, further comprising a detector configured to detect a reflected light formed by the first light reflected from the substrate to inspect the substrate.

* * * * *